United States Patent [19]

Wilcox et al.

[11] 4,334,869
[45] Jun. 15, 1982

[54] EDUCATIONAL MATHEMATICS GAME

[76] Inventors: Charles E. Wilcox, c/o George Spector, 3615 Woolworth Bldg., 233 Broadway; George Spector, 3615 Woolworth Bldg., 233 Broadway, both of New York, N.Y. 10007

[21] Appl. No.: 154,904

[22] Filed: May 30, 1980

[51] Int. Cl.³ ............... G09B 1/04; G09B 19/02
[52] U.S. Cl. ................................................ 434/208
[58] Field of Search ............... 434/175, 205, 208, 209, 434/195; 273/153 S

[56] References Cited

U.S. PATENT DOCUMENTS

| | | | |
|---|---|---|---|
| 6,407 | 5/1849 | Allen | 434/209 |
| 1,310,997 | 7/1919 | Linay | 434/208 |
| 1,403,989 | 1/1922 | Verneau | 434/208 |
| 3,248,804 | 5/1966 | Jorgens | 434/195 |

Primary Examiner—William H. Grieb

[57] ABSTRACT

An educational puzzle that teaches mathematics; the puzzle including a gameboard in the form of a tray, and a plurality of blocks placeable therein, each block being printed with a single numerical digit, and the blocks being arranged in horizontal and vertical rows so as to form a table from "1" to "9" in each direction, and the tray being divided by a central partition having a central gate.

3 Claims, 4 Drawing Figures

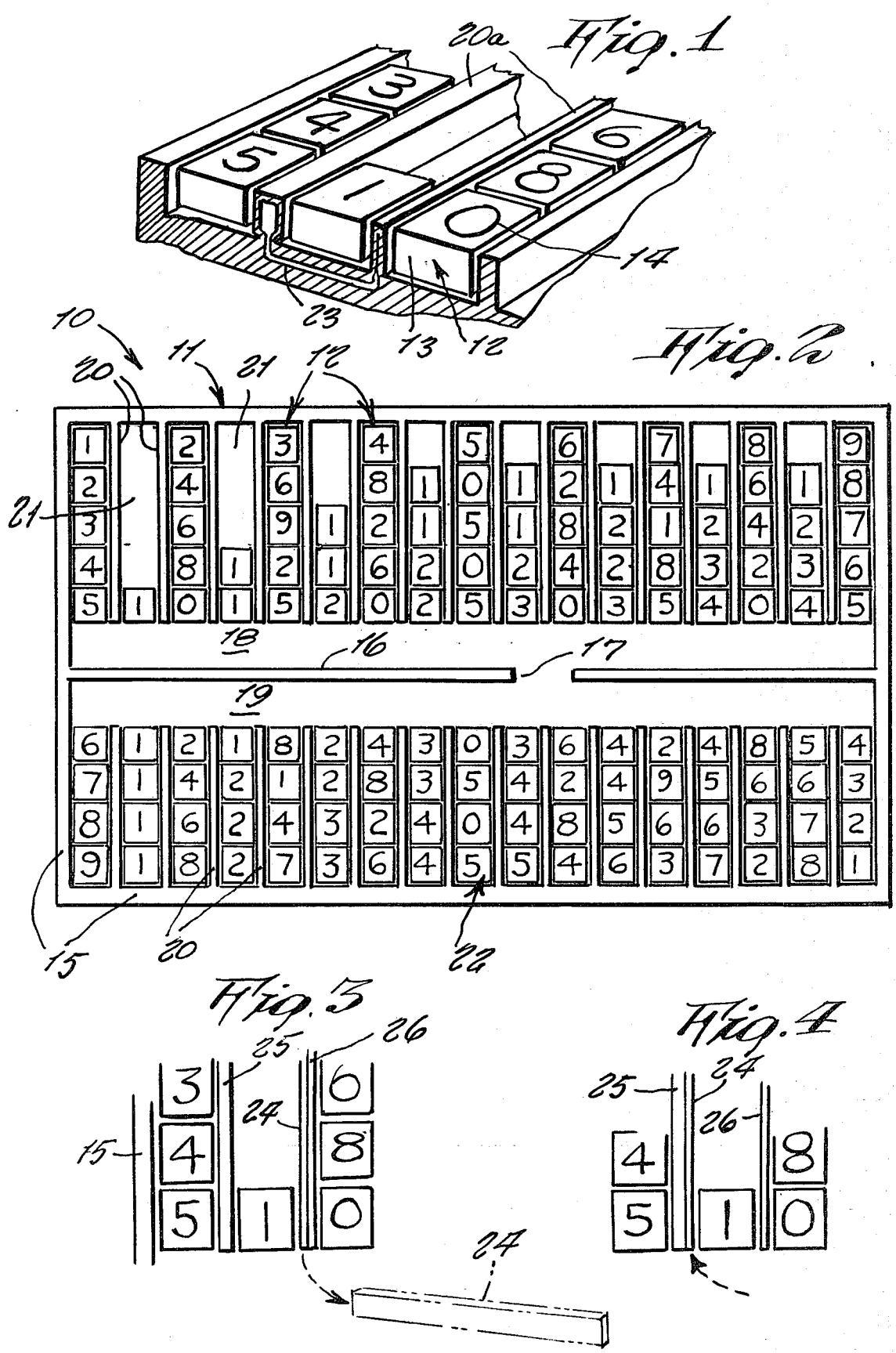

EDUCATIONAL MATHEMATICS GAME

This invention relates generally to mathematical toys.

A principal object of the present invention is to provide a puzzle in which mixed up numbers can be arranged so to form a mathematical table, so that the player learns basic mathematics therefrom.

Another object accordingly is to provide a shuffling mathematics that is entertaining and educational for children as well as others who require learning.

In the drawing

FIG. 1 is a fragmentary perspective view of one design of the invention in which certain partitions can be widened or narrowed so to group numbers for more clear reading thereof; thus in the example illustrated, a "one" is shifted closer to a "zero" so as to distinguish between the "five" and a "ten."

FIG. 2 is a top view of the invention with all number blocks positioned in their proper rows.

FIGS. 3 and 4 show another method of widening or narrowing a partition.

Refering now to the drawing in greater detail, the reference numeral 10 represents a shuffling mathematics puzzle according to the present invention, wherein there is a gameboard 11 upon which a plurality of one hundred fifty seven playing pieces 12 are placable and slidable in order to assemble the puzzle.

The playing pieces comprise square blocks 13 of a same size and upon each of which a single numerical digit 14 is printed, the numerals comprising numbers between "0" to "9".

The gameboard is in a form of a rectangular tray by including a low peripheral wall 15 around all sides and also including a single, central, transverse partition 16 having a central opening 17 therethrough so that the playing pieces may be moved therethrough between compartments 18 and 19 formed by the partition. Additionally in each compartment, a plurality of parallel, equally spaced apart partitions 20 (shown in FIG. 1) are formed integral with the tray in order to form trays 21 within which the blocks can be slided, so that they may thus be arranged in a pattern, as shown, that forms a mathematical table 22, when each is in its proper position.

The mathematical table includes placement of the blocks so that a horizontal top row of numbers reads "1" to "9" from left to right, and a left-most vertical row reads "1" to "9" from top to bottom, as also shown in FIG. 1. The remaining blocks are placed so that a multiplication numerical sum between any number on the horizontal top row and any number on the left-most vertical row is located where a horizontal and a vertical line from the selected numbers cross each other. Thus, for example: a numeral "4" along the top row multiplied by a "5" in the left-most row results in a sum of "20" located at a crossing of vertical and horizontal lines from these numbers.

The table thus formed, will teach arrangements of numbers, and the tables of multiplication and division. The table also teaches the particularly interesting features of a "9" table that has always fascinated mathematicians, such as the sum of any numeral multiplied by a nine results in digits that always add up to "9". Also throughout the table, the numerical digits fall into various sequential patterns, as is evident by a view of FIG. 1, so that the same is educational.

In FIG. 1, the tray partitions 20a are shown to be made to be expandable in width so as to more clearly distinguish between a whole number (comprised of several digits) from other adjacent numbers. Thus in the example illustrated, the wide partition between the "5" and "1", and the narrow partition between the "1" and "0", readily allows a clearer reading of "5" and "10". The partition is made of resilient rubber and is inflatable by air in a sealed passage 23 that extends in adjacent pairs of partitions and an intercommunicating portion therebetween and located below the gameboard surface.

In FIGS. 3 and 4, a similar accomplishment is attained by selective placement of a loose stick 24 adjacent either fixed partition 25 or 26. The partition 25 is equal to a thickness of a combined thickness of partition 26 and the stick, so that a control of partitioning thickness is possible in order to be the same as in FIG. 1 or else as in FIG. 2. Each alternate tray partition comprises partition 25 and each other alternate partition is a partition 26.

What is claimed as new, is:

1. An educational game comprising in combination, a gameboard and a plurality of playing piece blocks movable on said gameboard, each block having a numerical digit thereon said gameboard including a plurality of bays defining between a plurality of parallel spaced apart partitions, said blocks being slidable into said bays so to form horizontal and parallel rows of said blocks, said numerical digits on said blocks thus defining a mathematical table, and means whereby said partitions are adjustable in thickness.

2. The combination as set forth in claim 1 wherein said means comprises said partitions being air inflated.

3. The combination as set forth in claim 1 wherein said means comprises a separate stick placeable adjacent a selected one of said partitions.

* * * * *